United States Patent [19]

Blenke et al.

[11] 4,355,508
[45] Oct. 26, 1982

[54] AIR POWER MOTOR

[75] Inventors: Joseph F. Blenke; Stanley J. Blenke, Sr., both of Three Oaks, Mich.

[73] Assignee: U.S. Foam Mfg. Co., Inc., Three Oaks, Mich.

[21] Appl. No.: 146,042

[22] Filed: May 2, 1980

[51] Int. Cl.³ .............................................. F16D 31/02
[52] U.S. Cl. ........................................ 60/416; 60/415; 180/165; 180/302
[58] Field of Search .................. 60/370, 407, 415, 416; 180/165, 302

[56] References Cited

U.S. PATENT DOCUMENTS 3,847,058 11/1974 Manor ................................ 60/370 X
3,925,984 12/1975 Holleyman ..................... 180/302 X Primary Examiner—Allen M. Ostrager
Assistant Examiner—Stephen F. Husar
Attorney, Agent, or Firm—Oltsch, Knoblock & Hall

[57] ABSTRACT

A motor utilizing compressed air as the working fluid. Compressed air circulates from a first or high pressure tank through an air reactance member, then to pressure regulating member and to a second or intermediate pressure tank and the air reactance member. The drive shaft of the air reactance member delivers mechanical power. An air compressor is driven from the drive shaft and is employed to recharge or supplement pressure in each tank.

5 Claims, 2 Drawing Figures

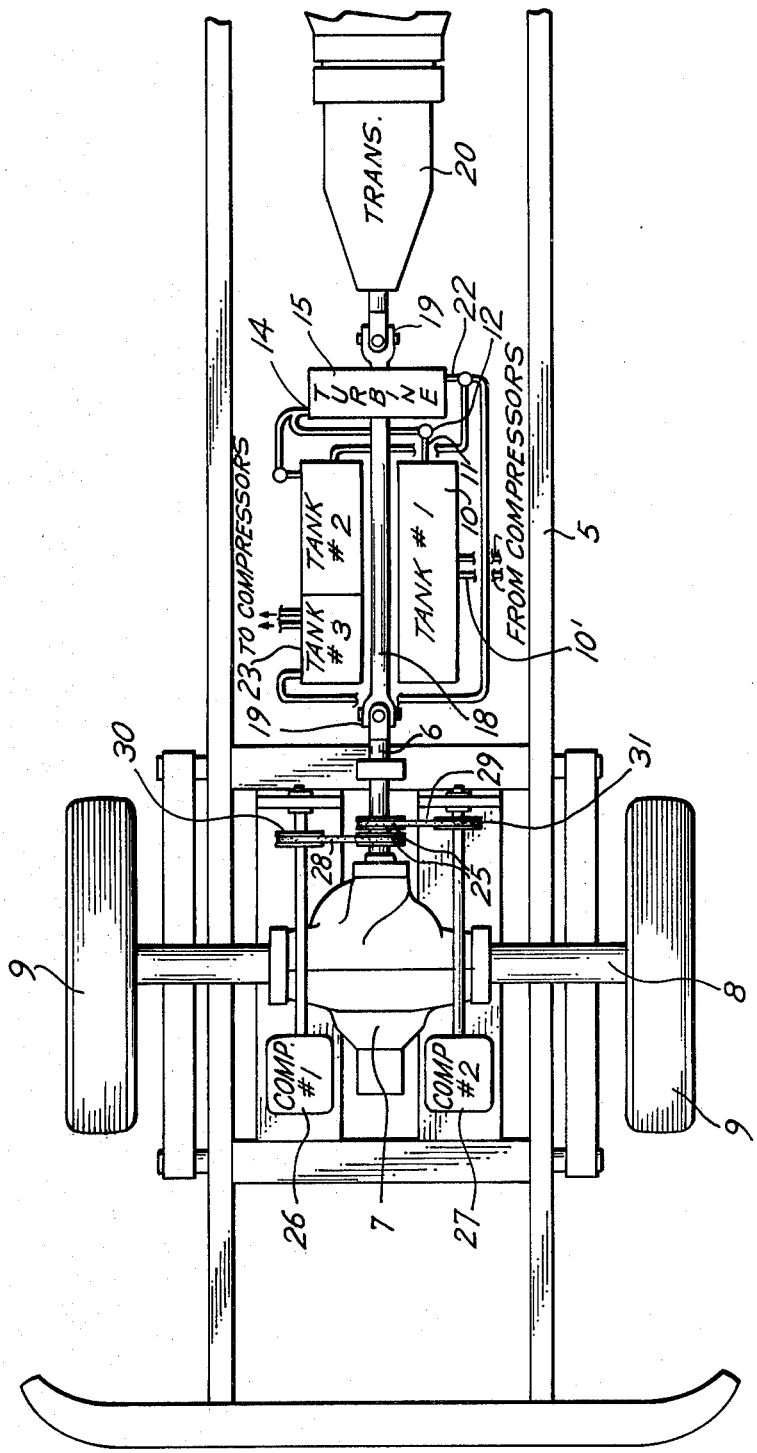

AIR POWER MOTOR

SUMMARY OF THE INVENTION

This invention relates to an air power motor which employs compressed air as the working fluid. The motor may be a prime power source or a supplement to another power source. In the motor, compressed air is contained in a first tank. From this first tank compressed air is discharged to flow through an air reactance member or turbine wherein mechanical power is produced. A control valve regulates the rate of air flow to control the rate of power production. The air reactance member or turbine has a circular housing within which a drive shaft is journaled for rotation. Radial vanes are attached to the drive shaft and extend adjacent to the circumferential wall of the turbine housing. Annular plates close the ends of the turbine housing and carry the drive shaft bearings. The vanes extend axially within and substantially span the housing between the said annular plates. Air is admitted to the housing of the reactance member through an air inlet in a generally tangential direction causing the vanes and drive shaft to rotate. After traveling partially around the interior of the turbine housing, the air is exhausted through an air outlet port and to air compressors driven from the reactance member drive shaft and connected to a second tank, after pressure in the first tank is reduced, air is discharged from the second tank to and through the reactance member. Suitable controls are provided to regulate the connections between the tanks, the reactance member and the compressor. The drive shaft also may have pulleys or other drive means attached thereto with which to drive power consuming devices. A reserve tank may be utilized to supply compressed air to the first tank as controlled by a valve to maintain the preferred air pressure in the first tank.

Accordingly, it is an object of this invention to provide an air power motor which employs compressed air supplied to a reactance member in successive stages.

Another object is to provide an air power motor which employs an air reactance member to produce mechanical power.

Yet another object is to provide an air power motor which is efficient and economical in operation and can be used as a primary power source or as a supplemental power source.

Still another object is to provide an air power motor which is simple in design and inexpensive to manufacture.

Further objects will be apparent from the following specification.

BRIEF DESCRIPTION OF THE DRAWINGS

FIG. 2 is a fragmentary plan view of a vehicle powered by the air motor.

DESCRIPTION OF THE PREFERRED EMBODIMENTS

Figure 1:
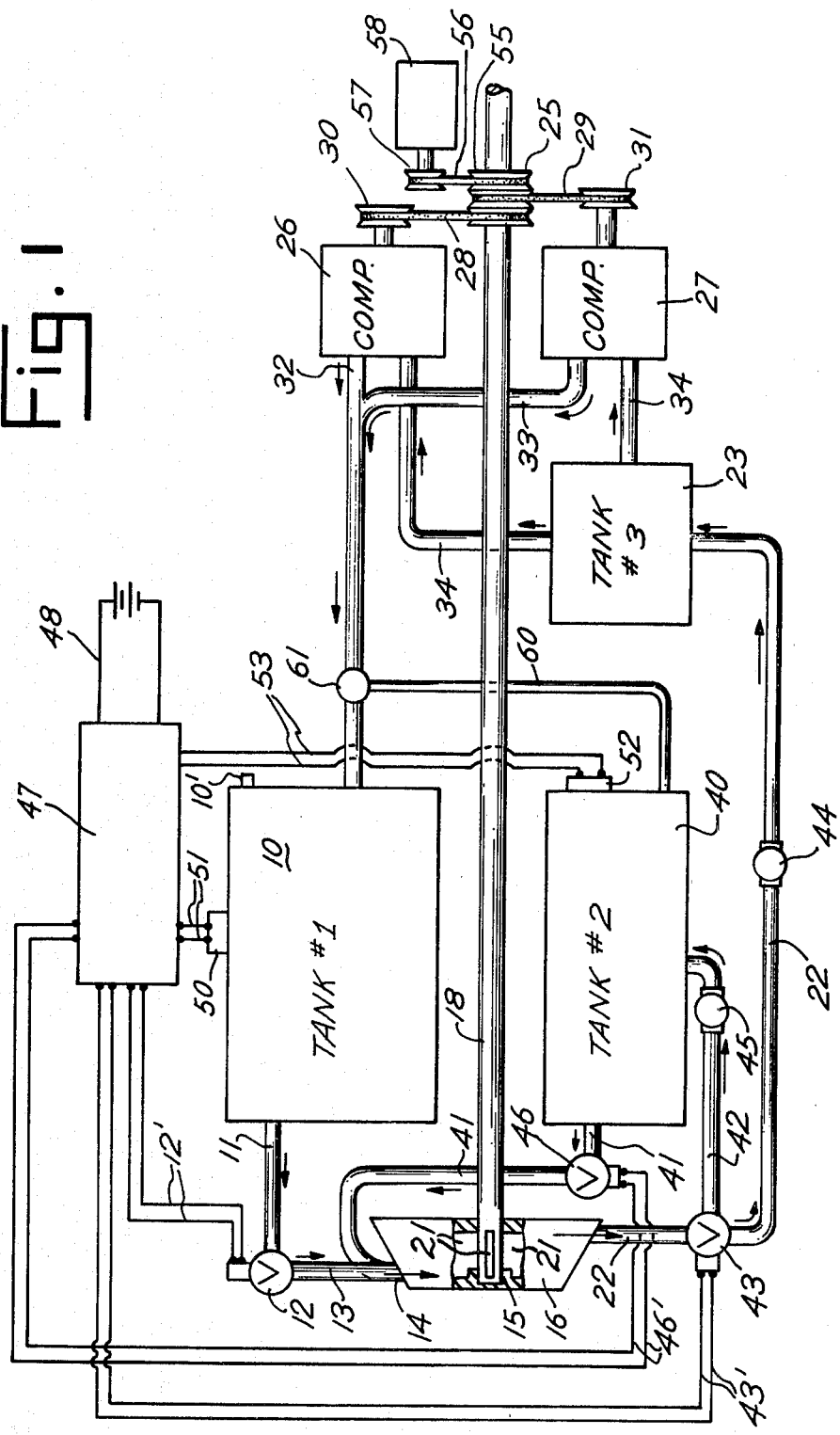
FIG. 1 is a diagramatic representation of the air power motor and associated parts.

The preferred embodiment illustrated is not intended to be exhaustive nor to limit the invention to the precise form disclosed. It is chosen and described in order to best explain the principles of the invention and an illustrative application and use, to thereby enable others skilled in the art to utilize the invention.

One embodiment of this invention is shown in FIG. 2 as applied to a vehicle having a chassis 5, drive shaft 6, differential gear unit 7, drive axle 8 and drive wheels 9.

The air power motor of this invention includes a first tank 10 which may be charged with compressed air at a high pressure, preferably from 1,000 to 3,000 pounds per square inch gauge. Tank 10 has a port to which is connected a conduit 11. A control valve 12 connected to conduit 11 controls the flow of air from tank 10. A conduit 13 connects valve 12 to the inlet port 14 of air reactance unit or turbine 15. Tank 10 may also have an inlet 10' for connection with an external supply of compressed air (not shown).

Air reactance unit 15 has a closed cylindrical housing 16 in which a drive shaft 18 is journaled for rotation. Shaft 18 may be connected to shaft 6, by universal joint 19. Within the turbine housing 15, vanes (not shown) extend substantially axially and are closely proximate at their edges to the annular wall and end plates of the housing.

Air from tank 10 is admitted through air inlet port 14 in a generally tangential direction. The air stream from port 14 impinges upon successive vanes 21 and causes the vanes and drive shaft 18 to rotate. As the drive shaft rotates, successive vanes pass the port 14 and are acted upon by the air stream from port 14. Air is exhausted from reactance member housing 15 through an air outlet port and conduits 22 to a second tank 23. Suitable means may be carried by the housing 15 or by the vanes to minimize flow of air past the vanes.

The drive shaft 6, 18 is axially elongated and has pulleys 25 attached thereto which drive one or more air compressors 26, 27 through belt or chain drives 28, 29 and pulleys 30, 31. Air compressors 26, 27 are connected by conduits 32, 33 to tank 10 to recharge tank 10. Conduits 34 supply compressed air from tank 23 to compressors 26, 27. Check valves (not shown) may be interposed in conduits 32 and 34.

A tank 40 is connected by conduit 41 to reactance member 15 to discharge air tangentially into the member 15 at inlet port 14 to impinge upon vanes thereof in the same rotation producing direction as air delivered thereto by conduit 11 from tank 10. Tank 40 is connected by conduits 22, 42 to reactance member 15 under control of valve 43 to selectively discharge air from member 15 to tank 40. Conduit 22 preferably has a check valve 44 interposed therein and return conduit 42 preferably has a check valve 45 interposed therein. A valve 46 is interposed in line 41. Valves 12, 43 and 46 are control valves, such as solenoid valves responsive to a controller 47 in an operating circuit 48 which includes leads 12', 43' and 46'. A pressure responsive member 50 at tank 10 is connected by leads 51 to controller 47 and a pressure responsive member 52 is connected by leads 53 to controller 47.

Pulleys 55 may provide a drive connection, as through belt or chain 56 with a pulley 57 of a supplemental power member or generator 58. Member 58 may include a supplemental drive, such as an internal combustion engine (not shown) or may be a generator driven by shaft 18.

In the operation of the air power motor, air at high pressure, such as 3000 psi, is delivered from tank 10 through conduits 11, 13 for discharge into reactance member 15 and against the vanes thereof to impart rotation to shaft 18. Air at reduced pressure is discharged from reactance member 15 at a circumferentially spaced point from the connection of conduit 11 to member 15 through conduit 22 and into tank 23. The air pressure in tank 10 is supplemented by air delivered at selected pressure from one or both of the compressors 26 and 27 through conduits 32, 33. Return lines 32, 33 may be connected by line 60 to tank 40 under the control of a valve 61. Air at reduced pressure may also be discharged from member 15 through conduit 42 into tank 40 in which its pressure is supplemented by air delivered through conduit 60 from one or both compressors 26, 27. Air at lower pressure may be delivered from tank 40 to reactance member 15 through conduit 41 to provide a supplemental driving force acting on the reactance member 15. If desired, further stages of air supply at progressively reduced pressures may be provided by connecting additional tanks (not shown) to the reactance member to supply further supplemental driving forces to the reactance member to supply further supplemental driving forces to the reactance member.

In the event that no external power is provided to maintain air pressure in tank 10, the motor will function for a period of time, after which air pressure in tank 10 must be supplemented from an external source connected at tank inlet 10'. Alternatively, a supplemental power source or a generator such as shown at 58 may be relied upon as necessary to continue generation and supply of the necessary air pressure in the system.

Operation of the motor when originally charged with a selected air pressure in tank 10, such as 1,000 psi entails operation of reactor or turbine 15 by discharge of air from tank 10, and the turbine 15 is caused to operate at selected speed as determined by the setting of valve 12. The exhaust of air from the turbine through line 22, 42 may occur under the control of valve 43 to pressurize tank 40 to a selected pressure, such as 800 psi. When the pressure in tank 10 is reduced, for example to approximately 200 psi, the supply of air from tank 10 to the turbine 15 is shut off at valve 12 and air from tank 40 is supplied through line 41 controlled by valve 46 to drive the turbine. The air discharged from the turbine when operated by air from tank 40 is then delivered to tank 23 under control of valves 43, 44 and delivered to the compressors 26, 27 whose operation serves to recharge tank 10.

It is to be understood that this invention is not to be limited to the precise form described, but that it may be modified within the scope of the appended claims.

What we claim is:

1. An air power motor comprising, a first tank adapted to be pressurized with compressed air; an air reactance means having air inlet port, an air outlet port circumferentially spaced from said outlet port, and a drive shaft, conduit means for conducting compressed air from said first tank to the inlet port of said reactance member; a second tank connected to receive reduced pressure air from said reactance member, a compressor driven by said shaft to pressurize said second tank with compressed air at lower pressure than said first tank and conduit means for conducting compressed air from said second tank to said reactance member to supplement the driving force exerted by air from said first tank.

2. The air power motor defined in claim 1 wherein a third tank is connected to receive reduced pressure air from said reactance member, said compressor is selectively connected to pressurize air from said third tank to said first tank.

3. The air power motor as defined in claim 1 wherein said air compressor means includes at least two compressors.

4. The air power motor as defined in claim 1, and means for controlling the air pressure delivered to each tank.

5. An air powered motor as defined in claim 1, and supplemental power driven means for actuating said compressor.

* * * * *